United States Patent
Aboul-Magd et al.

(10) Patent No.: US 10,523,404 B2
(45) Date of Patent: Dec. 31, 2019

(54) MEDIA ACCESS CONTROL FOR FULL DUPLEX COMMUNICATIONS

(71) Applicants: Osama Aboul-Magd, Ottawa (CA); Jung Hoon Suh, Ottawa (CA); Kwok Shum Au, Ottawa (CA)

(72) Inventors: Osama Aboul-Magd, Ottawa (CA); Jung Hoon Suh, Ottawa (CA); Kwok Shum Au, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 29 days.

(21) Appl. No.: 15/784,595

(22) Filed: Oct. 16, 2017

(65) Prior Publication Data

US 2019/0116018 A1    Apr. 18, 2019

(51) Int. Cl.
*H04L 5/14* (2006.01)
*H04W 74/08* (2009.01)

(52) U.S. Cl.
CPC .............. *H04L 5/14* (2013.01); *H04W 74/08* (2013.01)

(58) Field of Classification Search
CPC ................................ H04L 51/14; H04W 74/08
See application file for complete search history.

(56) References Cited

U.S. PATENT DOCUMENTS

| | | |
|---|---|---|
| 2015/0195079 A1 | 7/2015 | Gong |
| 2016/0278081 A1 | 9/2016 | Chun et al. |
| 2017/0078076 A1* | 3/2017 | Fang .................... H04L 5/14 |
| 2018/0084548 A1* | 3/2018 | Min ..................... H04L 5/0073 |
| 2018/0091284 A1* | 3/2018 | Min ..................... H04L 5/1469 |
| 2018/0192425 A1* | 7/2018 | Yeh ..................... H04L 5/0055 |
| 2018/0192431 A1* | 7/2018 | Wang ............... H04W 72/1252 |

FOREIGN PATENT DOCUMENTS

| | | |
|---|---|---|
| CN | 106656429 A | 5/2017 |
| WO | 2015187160 A1 | 12/2015 |
| WO | 2016144887 A1 | 9/2016 |

OTHER PUBLICATIONS

Rakesh Taori, et al., Considerations for In-Band Simultaneous Transmit and Receive (STR) feature in HEW, IEEE 11-13/1122r1, Sep. 16, 2013.

* cited by examiner

*Primary Examiner* — Steven H Nguyen (57) ABSTRACT

Methods and apparatuses for asymmetric full duplex (FD) communications. Information about an uplink (UL) transmission opportunity (TXOP), including an indication of the TXOP, is sent by an access point (AP). The AP sends a downlink (DL) transmission to a receiving station. During the TXOP, an UL transmission is received from a transmitting station. The UL transmission at least partially overlaps in time with the DL transmission. Acknowledgement of the UL transmission is sent to the transmitting station, and acknowledgement of the DL transmission is received from the receiving station, at a synchronized time.

18 Claims, 9 Drawing Sheets

MEDIA ACCESS CONTROL FOR FULL DUPLEX COMMUNICATIONS

FIELD

The present disclosure is related to methods and systems for full duplex communications in Wi-Fi communications. In particular, the present disclosure is related to methods and systems suitable for asymmetric full duplex Wi-Fi communications.

BACKGROUND

In full duplex (FD) communications, downlink (DL) transmissions (e.g., from an access point (AP) to a station (STA)) and uplink (UL) transmissions (e.g., from a STA to an AP) can take place simultaneously.

In symmetric FD communications, the same two nodes are involved in both DL transmission and UL transmission. For example, an AP sends DL transmissions to a STA and the same STA sends UL transmissions to the AP. Because the same pair of nodes is involved in both the DL and UL transmissions, issues of synchronization of the DL and UL transmissions can be addressed in a relatively straightforward manner.

In asymmetric FD communications, DL transmission occurs between one pair of nodes (e.g., the AP and a first STA), but UL transmission involves a different third node (e.g., the AP and a second STA). The first STA and second STA may not be synchronized, and the DL transmission and UL transmission may interfere with each other. It would be desirable to provide an improved way to coordinate such FD communications, for example a way for the AP to coordinate timing of the DL and UL transmissions.

SUMMARY

In various examples described herein, methods and systems for carrying out FD communications are described. The AP may provide information about an UL transmission opportunity (TXOP) in the header of a DL frame, for example. The AP may also transmit a block acknowledgement request (BAR) frame, to synchronize acknowledgements (ACKs) of the DL and UL transmissions.

In some aspects, the present disclosure describes a method for asymmetric FD communications. The method includes sending information about an UL TXOP. The information about the TXOP includes an indication of the TXOP. The method also includes sending a DL transmission to at least one first receiving station. The method also includes, during the TXOP, receiving an UL transmission from at least one second transmitting station. The UL transmission at least partially overlaps in time with the DL transmission. The method also includes sending acknowledgement of the UL transmission to the at least one second transmitting station and receiving acknowledgement of the DL transmission from the at least one first receiving station, at a synchronized time.

In any of the preceding aspects/embodiments, the method may include: at a later one of end of the UL transmission or end of the DL transmission, sending a block acknowledgement request (BAR) frame. The synchronized time may be synchronized according to the BAR frame.

In any of the preceding aspects/embodiments, the indication of the TXOP may be sent in a header of the DL transmission.

In any of the preceding aspects/embodiments, the indication of the TXOP may be sent in a trigger frame broadcast ahead of the DL transmission.

In any of the preceding aspects/embodiments, the information about the TXOP may include one or more contention parameters to permit two or more stations to compete for UL channel access.

In any of the preceding aspects/embodiments, the one or more contention parameters may include an identification of the two or more stations to compete for channel access.

In any of the preceding aspects/embodiments, the DL transmission may be a multi-user (MU) DL transmission to two or more receiving stations over respective resource units (RUs). The information about the TXOP may include an indication of two or more RUs available for UL transmission by respective ones of two or more transmitting stations. Aknowledgement of the UL transmission may be a MU acknowledgement sent to the two or more transmitting stations.

In some aspects, the present disclosure describes an AP for FD communications. The AP includes a memory; an interface for wireless communication with at least one first receiving station and at least one second transmitting station; and a processing device. The processing device is configured to execute instructions stored in the memory to cause the AP to send information about an UL TXOP. The information about the TXOP includes an indication of the TXOP. The processing device is also configured to execute instructions to cause the AP to send a DL transmission to the at least one first receiving station. The processing device is also configured to execute instructions to cause the AP to, during the TXOP, receive an UL transmission from the at least one second transmitting station. The UL transmission at least partially overlaps in time with the DL transmission. The processing device is also configured to execute instructions to cause the AP to send acknowledgement of the UL transmission to the at least one second transmitting station and receive acknowledgement of the DL transmission from the at least one first receiving station, at a synchronized time.

In any of the preceding aspects/embodiments, the processing device may be further configured to execute instructions to cause the AP to: at a later one of end of the UL transmission or end of the DL transmission, send a BAR frame. The synchronized time may be synchronized according to the BAR frame.

In any of the preceding aspects/embodiments, the indication of the TXOP may be sent in a header of the DL transmission.

In any of the preceding aspects/embodiments, the indication of the TXOP may be sent in a trigger frame broadcast ahead of the DL transmission.

In any of the preceding aspects/embodiments, the information about the TXOP may include one or more contention parameters to permit two or more stations to compete for UL channel access.

In any of the preceding aspects/embodiments, the one or more contention parameters may include an identification of the two or more stations to compete for channel access.

In any of the preceding aspects/embodiments, the DL transmission may be a MU DL transmission to two or more receiving stations over respective RUs. The information about the TXOP may include an indication of two or more RUs available for UL transmission by respective ones of two or more transmitting stations. Acknowledgement of the UL transmission may be a MU acknowledgement sent to the two or more transmitting stations.

In some aspects, the present disclosure describes a method for asymmetric FD communications. The method includes receiving, in a frame header of a DL transmission sent from an AP to at least one other DL receiving station, information about an UL TXOP. The information about the TXOP includes an indication of the TXOP. The method also includes sending an UL transmission to the AP, using the information about the TXOP. The UL transmission at least partly overlaps in time with the DL transmission. The method also includes receiving acknowledgement of the UL transmission from the AP.

In any of the preceding aspects/embodiments, the method may include receiving a BAR frame. The acknowledgement of the UL transmission may be received at a synchronized time that is synchronized according to the BAR frame.

In any of the preceding aspects/embodiments, the method may include competing for channel access to send the UL transmission. The competing may be carried out in accordance with one or more contention parameters included in the information about the TXOP.

In any of the preceding aspects/embodiments, the one or more contention parameters may include an identification of two or more stations to compete for channel access.

In some aspects, the present disclosure describes a STA for participating in FD communications. The STA includes a memory; an interface for wireless communication with an AP; and a processing device. The processing device is configured to execute instructions stored in the memory to cause the STA to: receive, in a frame header of a DL transmission sent from the AP to at least one other DL receiving station, information about an UL TXOP. The information about the TXOP includes an indication of the TXOP. The processing device is also configured to execute instructions to cause the STA to send an UL transmission to the AP, using the information about the TXOP. The UL transmission at least partly overlaps in time with the DL transmission. The processing device is also configured to execute instructions to cause the STA to receive acknowledgement of the UL transmission from the AP.

In any of the preceding aspects/embodiments, the processing device may be further configured to execute instructions to cause the STA to: receive a BAR frame. The acknowledgement of the UL transmission may be received at a synchronized time that is synchronized according to the BAR frame.

In any of the preceding aspects/embodiments, the processing device may be further configured to execute instructions to cause the STA to: compete for channel access to send the UL transmission. The competing may be carried out in accordance with one or more contention parameters included in the information about the TXOP.

In any of the preceding aspects/embodiments, the one or more contention parameters may include an identification of two or more stations to compete for channel access In some aspects, the present disclosure describes a method for asymmetric FD communications. The method includes receiving a DL transmission from an AP. The method also includes receiving a BAR frame from the AP. The method also includes sending acknowledgement of the DL transmission to the AP at a synchronized time that is synchronized according to the BAR frame.

In some aspects, the present disclosure describes a STA for participating in FD communications. The STA includes a memory; an interface for wireless communication with an AP; and a processing device. The processing device is configured to execute instructions stored in the memory to cause the STA to receive a DL transmission from the AP. The processing device is also configured to execute instructions to cause the STA to receive a BAR frame from the AP. The processing device is also configured to execute instructions to cause the STA to send acknowledgement of the DL transmission to the AP at a synchronized time that is synchronized according to the BAR frame.

In any of the preceding aspects/embodiments, the BAR frame may include identification of a RU for sending the acknowledgement. The acknowledgement may be sent using the identified RU.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Examples described herein provide methods and systems for carrying out asymmetric FD communications. The AP may provide information about an UL transmission opportunity (TXOP) in the header of a DL frame, for example. The AP may also transmit a block acknowledgement request (BAR) frame, to synchronize acknowledgements (ACKs) of the DL and UL transmissions.

Figure 1A:
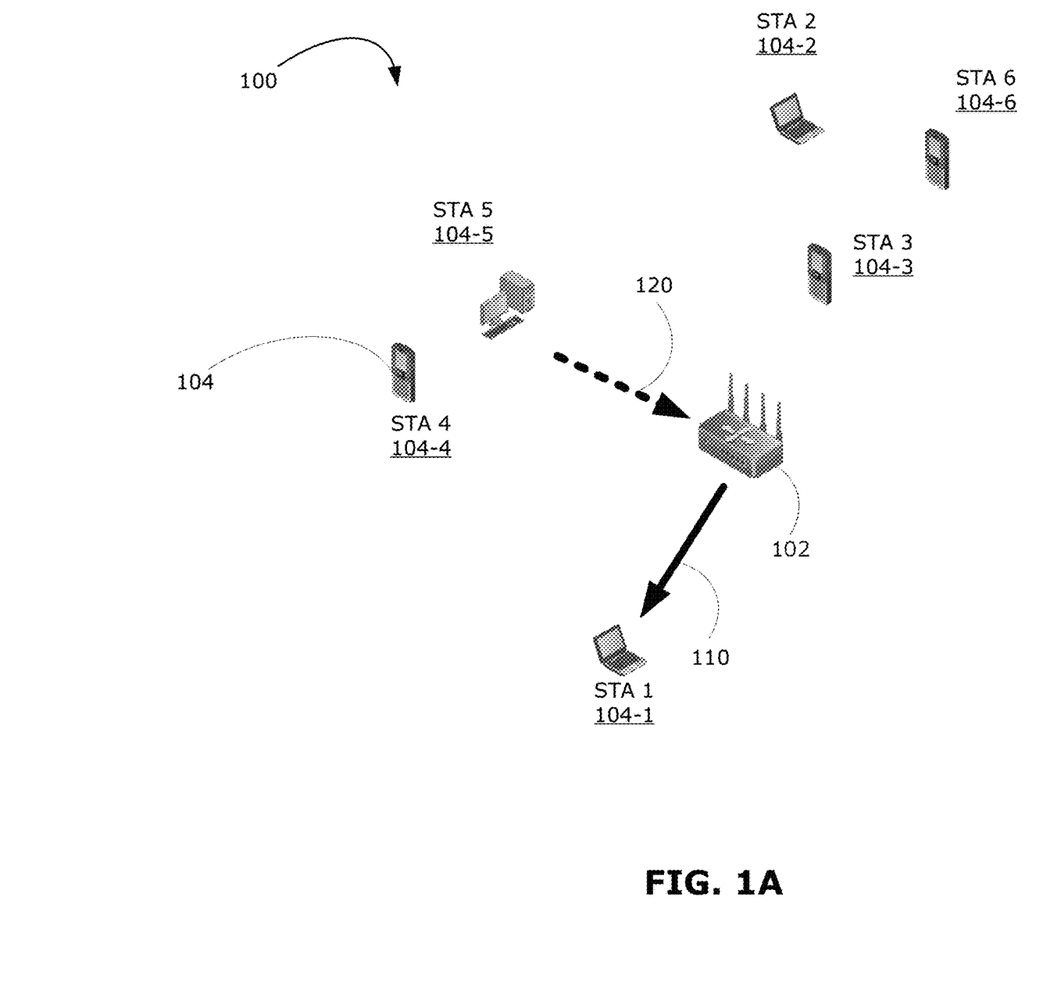
FIG. 1A is a schematic diagram illustrating an example system for asymmetric full duplex communications.

FIG. 1A is a schematic diagram of an example system 100 in which methods described herein may be implemented. The system 100 illustrates a Wi-Fi infrastructure, where transmissions all go through an access point (AP) 102, which has full duplex (FD) capabilities. The AP 102 may be also referred to as a principal control point (PCP) or a base station. The AP 102 may be implemented as a router, for example. Multiple stations (STAs) 104 are associated with the AP 102. Each STA 104 may operate independently of each other, with different capabilities. For example, each STA 104 may or may not have FD capabilities. In the example shown, there are 6 STAs, each labeled STA 1 to STA 6 (individually, 104-1 to 104-6; generally referred to as STAs 104). The STAs 104 may also be referred to as terminals, user devices, user equipment (UE) or clients, for example. Each STA 104 may be any suitable device capable of wireless communication, including mobile or stationary devices such as smartphones, laptops, mobile phones or tablet devices, for example, and the STAs 104 need not be the same as each other.

The system 100 may support communication between the AP 102 and each STA 104, as well as communication directly between STAs 104 (also referred to as device-to-device communication). The AP 102 may also carry out multi-user transmissions (e.g., transmissions from the AP 102 to multiple STAs 104 simultaneously), for example by using directional antennas.

Figure 1B:
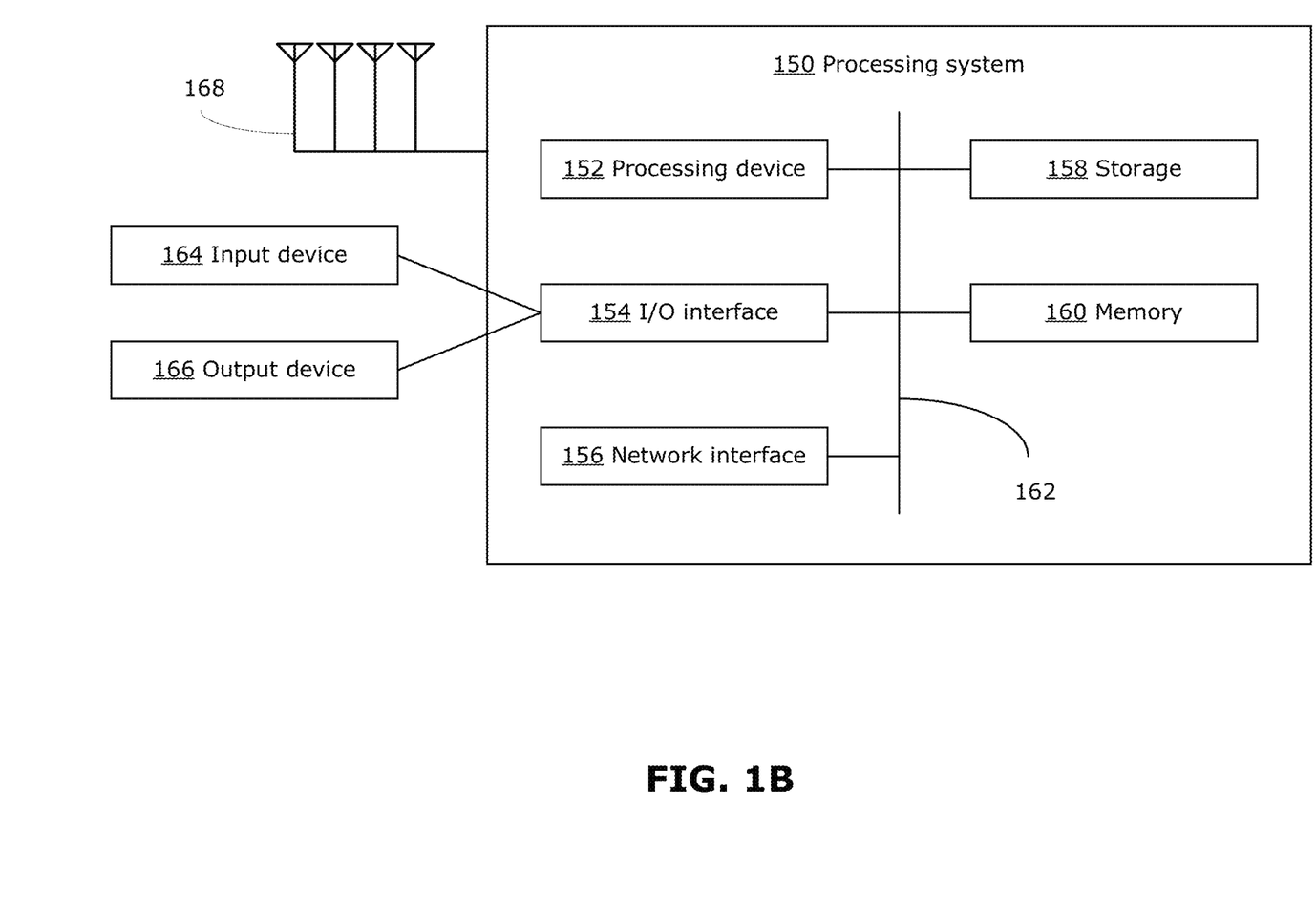
FIG. 1B is a block diagram illustrating an example device suitable for performing asymmetric full duplex communications.

FIG. 1B is a block diagram illustrating an example processing system 150, which may be used to implement the methods and systems disclosed herein, for example the AP 102 and/or one or more of the STAs 104. Other processing systems suitable for implementing the present disclosure may be used, which may include components different from those discussed below. Although FIG. 1B shows a single instance of each component, there may be multiple instances of each component in the processing system 150.

The processing system 150 includes one or more processing devices 152, such as a processor, a microprocessor, an application-specific integrated circuit (ASIC), a field-programmable gate array (FPGA), a dedicated logic circuitry, or combinations thereof. The processing system 150 may also include one or more input/output (I/O) interfaces 154, which may enable interfacing with one or more appropriate input devices 164 and/or output devices 166. The processing system 150 includes one or more network interfaces 156 for wired or wireless communication with a network (e.g., an intranet, the Internet, a P2P network, a WAN, a LAN, and/or a Radio Access Network (RAN)), including one or more nodes of the network. The network interface(s) 156 may include wired links (e.g., Ethernet cable) and/or wireless links for intra-network and/or inter-network communications. The network interface(s) 156 may provide wireless communication via one or more transmitters/receivers or transceiver antennas 168, for example. The antennas 168 may act together as an antenna array, in which case each antenna 168 may be referred to as an antenna element or radiating element of the antenna array. There may be a plurality of such antenna arrays. The processing system 150 may also include one or more storage units 158, which may include a mass storage unit such as a solid state drive, a hard disk drive, a magnetic disk drive and/or an optical disk drive.

The processing system 150 may include one or more memories 160, which may include a volatile or non-volatile memory (e.g., a flash memory, a random access memory (RAM), and/or a read-only memory (ROM)). The non-transitory memory(ies) 160 may store instructions (e.g., in the form of software modules) for execution by the processing device(s) 152, such as to carry out the methods described in the present disclosure. The memory(ies) 160 may include other software instructions, such as for implementing an operating system and other applications/functions. In some examples, one or more data sets and/or module(s) may be provided by an external memory (e.g., an external drive in wired or wireless communication with the processing system 150) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 162 providing communication among components of the processing system 150, including the processing device(s) 152, I/O interface(s) 154, network interface(s) 156, storage unit(s) 158 and/or memory(ies) 160. The bus 162 may be any suitable bus architecture including, for example, a memory bus, a peripheral bus or a video bus.

In FIG. 1B, the input device(s) 164 (e.g., a keyboard, a mouse, a microphone, a touchscreen, and/or a keypad) and output device(s) 166 (e.g., a display, a speaker and/or a printer) are shown as external to the processing system 150. In other examples, one or more of the input device(s) 164 and/or the output device(s) 166 may be included as a component of the processing system 150. In other examples, there may not be any input device(s) 164 and output device(s) 166, in which case the I/O interface(s) 154 may not be needed.

The AP 102 and STAs 104 may each include multiple antenna elements 168 forming antenna arrays, and may carry out appropriate beamforming and beam steering controls (e.g., using beamsteering circuits and/or beamsteering control modules implemented by the processing device 152 and processing system 150), in order to carry out directional wireless communication.

Returning to FIG. 1A, the AP 102 initiates a downlink (DL) transmission 110 to STA 1 104-1. The DL transmission 110 may include a frame (e.g., data frame), with a frame header (e.g., a physical layer (PHY) header or media access control (MAC) header) providing information about an uplink (UL) transmission opportunity (TXOP) (e.g., an indication of the TXOP). This is described in further detail below.

The other STAs 104 associated with the AP 102 may also receive this TXOP information (e.g., overhear on the DL transmission 110). A STA 104 may be able to take advantage of the TXOP to send an UL transmission to the AP 102. In the example shown, a UL transmission 120 is sent from STA 5 104-5 to the AP 102, overlapping in time with the DL transmission 110. In some examples, the AP 102 may further indicate (e.g., in the TXOP information provided in the header of the DL transmission 110) a maximum transmit power level or a permitted range of transmit power level for the UL transmission 120, so as to avoid or reduce possible interference with the ongoing DL transmission 110.

If multiple STAs 104 wish to send an UL transmission, the AP 102 may select a particular STA 104 for the UL transmission. Alternatively, two or more STAs 104 (which may or may not be selected by the AP 102) may compete for accessing the channel for the UL transmission.

In the case that the AP 102 selects a particular STA 104 for UL transmission, this may be referred to as the "scheduled" case. The AP 102 may have information about the geographical or spatial location of each associated STA 104, and may use this information to select a particular STA 104 for UL transmission 120 that is not expected to significantly interfere with the other STA 104 receiving the DL transmission 110. In the example of FIG. 1A, the AP 102 has selected STA 5 104-5 for the UL transmission 120, where the spatial location of STA 5 104-5 is such that the UL transmission 120 is not expected to interfere with STA 1 104-1 receiving the DL transmission 110 (e.g., STA 5 104-5 and STA 1 104-1 are located in different transmission sectors).

In the case that the STAs 104 compete for access to the channel for UL transmission, this may be referred to as the "contention" case. The AP 102 may select the group of two or more STAs 104 that may compete for channel access. For example, the AP 102 may determine that there are two or more STAs 104 in one or more transmission sectors that would not significantly interfere with the DL transmission 110, and select those two or more STAs 104 to compete for channel access. Any suitable contention protocol for channel access may be used. For example, contention could be implemented using a random access mechanism, in which each competing STA 104 generates a random number and counts down to zero. The count may optionally be decremented only when the STA 104 detects that the channel is below a certain power threshold (e.g., less than the maximum transmit power level indicated by the AP 102 in the header). By decrementing the count only when the channel is below a certain power threshold, this may help to ensure that the channel is accessed for the UL transmission 120 only when the transmit power level of the UL transmission 120 is low enough to reduce or avoid interference with the DL transmission 110.

Figure 2:
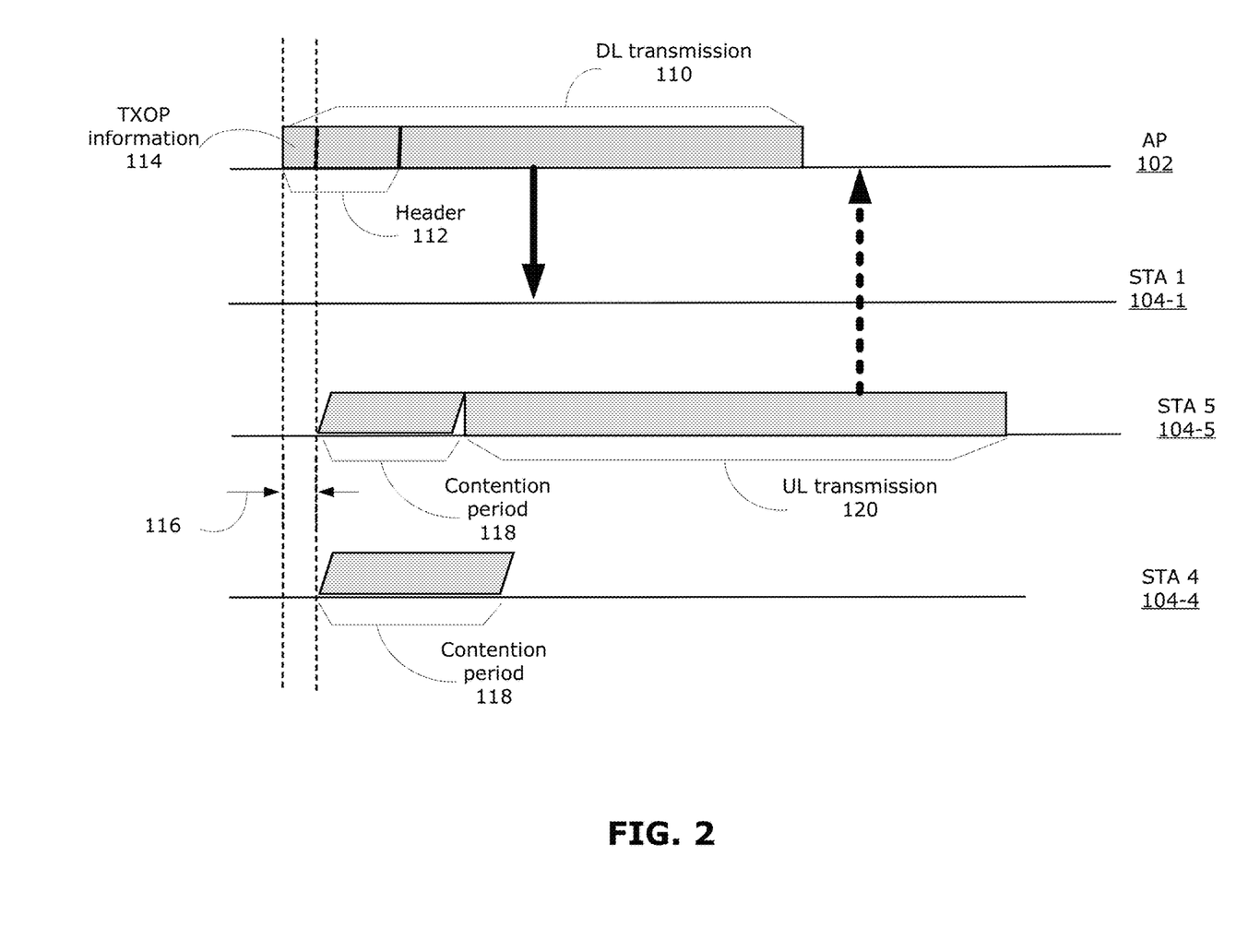
FIG. 2 is a timing diagram illustrating an example of contention for sending an uplink transmission by multiple stations.

Further details of the TXOP information are now described. FIG. 2 illustrates an example timing diagram for the contention case. The DL transmission 110 includes a frame having a header 112, which includes the PHY header and the MAC header of the transmission frame. The TXOP information 114 may be carried in the PHY header, the MAC header, or both (e.g., some TXOP information carried in the PHY header and the remaining TXOP information carried in the MAC header). In some examples, the TXOP information 114 may be carried in the PHY header, which may help to place the TXOP information 114 earlier in the DL transmission 110. Providing the TXOP information 114 earlier may allow competing STAs to begin contention sooner, if contention is used.

In some examples, at least some of the TXOP information 114 (e.g., indication of the TXOP, to inform other STAs of the opportunity for UL transmission) may be provided using a special purpose frame, such as a trigger frame. The trigger frame, which may also contain other information, may provide the indication of the TXOP, with other TXOP information 114 being carried in the header 112 of the DL transmission 110. In other examples, the TXOP trigger frame may carry some or all of the TXOP information 114.

The TXOP information 114 may include an indication of one or more STAs 104 (e.g., selected by the AP 102) for the UL transmission 120. In the scheduled case, the TXOP information 114 may include an indication (e.g., user equipment identifier (UEID)) of the STA 104 selected by the AP 102 for UL transmission 120. In the contention case, the TXOP information 114 may include an indication (e.g., UEID) of the group of two or more STAs 104 selected by the AP 102 to compete for channel access.

The TXOP information 114 may also include indication of a maximum or permitted range of power level for transmitting a communication, receiving a communication, or both. The TXOP information 114 may also include quality of service (QoS) information, for example the TXOP information 114 may indicate that the UL transmission is limited to the priority of one or more specified access categories, or at lower priority than a specified access category. Where multiple STAs 104 are to compete for channel access (e.g., where there are two or more STAs 104 indicated in the TXOP information 114), contention parameters may also be included in the TXOP information 114. Contention parameters may include, for example, a minimum (Wmin) and maximum (Wmax) value between which a random number is to be chosen by a STA 104 for random access contention. The TXOP information 114 may also include indication of a maximum PHY Layer Convergence Procedure (PLCP) protocol data unit (PPDU) length for the UL transmission 120. The maximum PPDU length may be determined by the AP 102 based on the length of the DL transmission 110. Indication of the maximum PPDU length may be used by the STA 104 sending the UL transmission 120 to help ensure that the UL transmission 120 ends at the same time as the DL transmission 110 (e.g., to cut off the UL transmission 120 or pad the UL transmission 120, as appropriate). Other information may be included in the TXOP information 114.

In the contention case, as illustrated by FIG. 2, when the AP 102 sends a DL transmission 110 to a first STA 104 (in this example, STA 1 104-1), other STAs 104 associated with the AP 102 may overhear the TXOP information 114 contained in the header 112 of the DL transmission 110, or otherwise receive indication of the TXOP. In FIG. 2, other STAs 104 receive the TXOP information 114 during a first time period 116. In the contention case, two or more competing STAs 104 (e.g., two or more STAs 104 selected by the AP 102, as indicated in the TXOP information 114) may then compete for channel access during a second time period, which may also be referred to as the contention period 118. In FIG. 2, STA 4 104-4 and STA 5 104-5 compete for channel access during the contention period 118. The winner of the contention (in this example, STA 5 104-5 has a shorter contention period 118 and thus wins over STA 4 104-4) may then send the UL transmission 120 to the AP 102 after winning the contention.

FIG. 2 illustrates the timing diagram in the contention case. The timing diagram may be similar for the scheduled case, with the difference that the contention period 118 may be omitted. That is, the UL transmission 120 by the selected STA 104 may begin immediately following the first time period 116.

Another challenge in asymmetric FD communications is the transmission of acknowledgement (ACK) frames. According to the IEEE 802.11 standard, an ACK should be sent by the receiving device short interframe spacing (SIFS) time units after the end of a received transmission. However, in asymmetric FD communications the receiving device for DL transmission may not be involved in the UL transmission, so the ACK transmission for the UL transmission may interfere with or be blocked by an ongoing DL transmission or vice versa. A mechanism for coordinating ACK transmissions is therefore described below for asymmetric FD communications.

Figure 3:
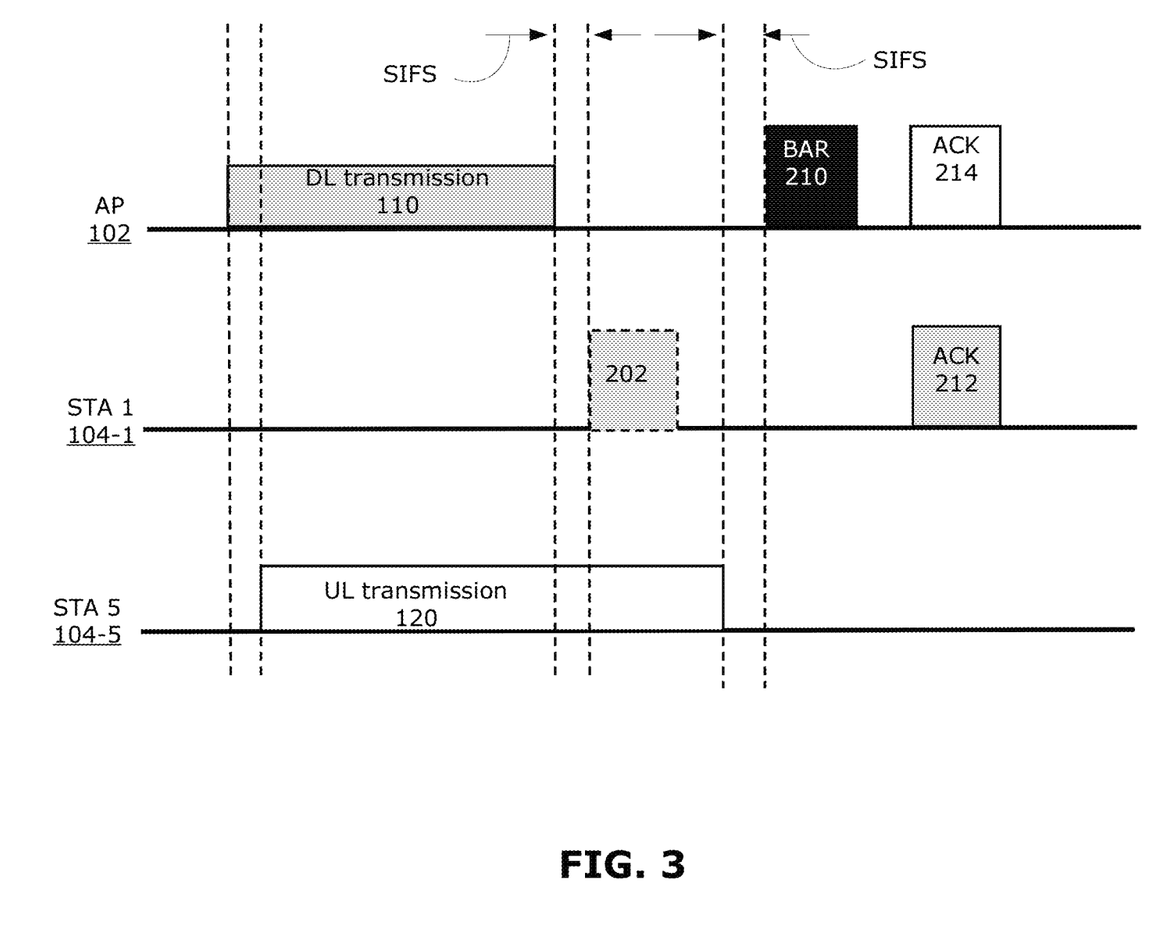
FIG. 3 is a timing diagram illustrating an example of synchronized acknowledgements in asymmetric full duplex communications, where the uplink transmission ends later than the downlink transmission.
Figure 4:
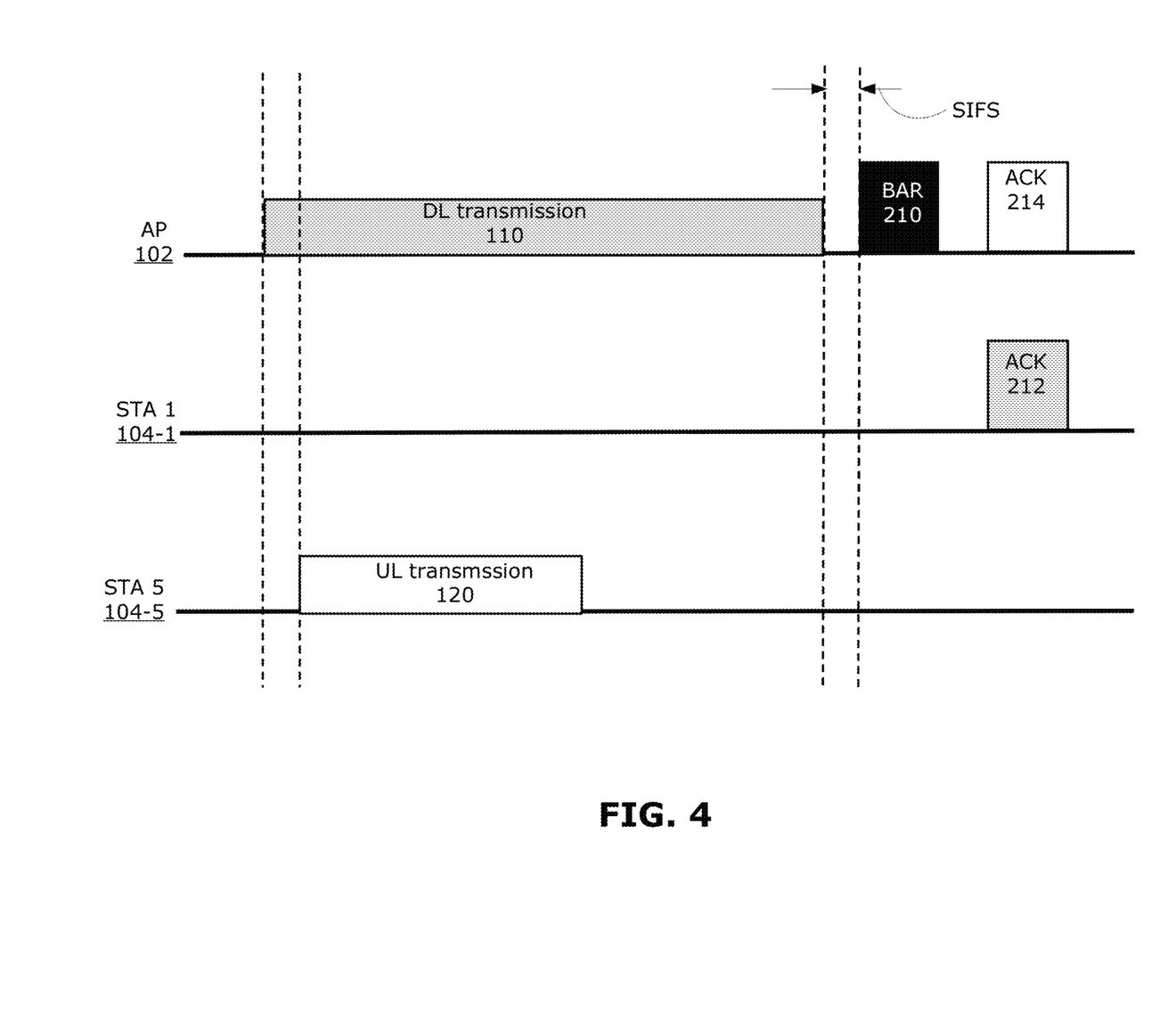
FIG. 4 is a timing diagram illustrating an example of synchronized acknowledgements in asymmetric full duplex communications, where the uplink transmission ends earlier than the downlink transmission.

FIGS. 3 and 4 illustrate two cases of asymmetric FD communications. For simplicity, no contention period is shown in FIGS. 3 and 4; however, it should be understood that the examples of FIGS. 3 and 4 may be implemented with or without contention.

In FIG. 3, the DL transmission 110 from the AP 102 to STA 1 104-1 ends earlier than the UL transmission 120 from STA 5 104-5 to the AP 102. Conventionally, STA 1 104-1 should send an ACK to the AP 102 after the SIFS time period following reception of the DL transmission 110; that is, STA 1104-1 should send an ACK at 202 as indicated in dashed lines. However, the UL transmission 120 is still ongoing and hence an ACK cannot be sent by STA 1 104-1 at 202 without an undesirable amount of interference. In order to coordinate or synchronize ACK transmissions, the AP 102 transmits a block ACK request (BAR) frame 210 to STA 1 104-1 after the UL transmission 120 (e.g., after the SIFS time period). The BAR frame 210 is received by STA 1 104-1 and is used to synchronize the ACK 212 from STA 1 104-1 to the AP 102 and the ACK 214 from the AP 102 to STA 5 104-5. The ACK 212 from STA 1 104-1 and the ACK 214 from the AP 102 are then sent at the same synchronized time, according to the BAR frame 210.

In FIG. 4, the DL transmission from the AP 102 to STA 1 104-1 ends later than the UL transmission 120 from STA 5 104-5 to the AP 102. Conventionally, STA 5 104-5 expects an ACK from the AP 102 when the UL transmission 120 ends (after a SIFS time period). However, the AP 102 is still sending the DL transmission 110 and cannot send an ACK to STA 5 104-5. Instead, STA 5 104-5 waits for the BAR frame 210 that the AP 102 sends to STA 5 104-5 after the DL transmission 110. The BAR frame 210 is also received by STA 1 104-1, and is used to synchronize the ACK 212 from STA 1 104-1 to the AP 102 and the ACK 214 from the AP 102 to STA 5 104-5. The ACK 212 from STA 1 104-1 and the ACK 214 from the AP 102 are then sent at the same synchronized time, according to the BAR frame 210.

When the ACKs are synchronized in this manner, the STAs are configured to not send ACKs and not expect ACKs following a FD transmission until a BAR frame is received. For example, the TXOP information may indicate to the STAs that asymmetric FD communications are expected and that ACKs are to be synchronized according to a BAR frame.

In some examples, other methods of synchronizing ACKs may be used in asymmetric FD communications. For example, the TXOP information may include an indication of the maximum PPDU length, as described above, so that the DL and UL transmissions end at the same time. In such a case, it may not be necessary to use a BAR frame to synchronize ACKs.

Figure 5:
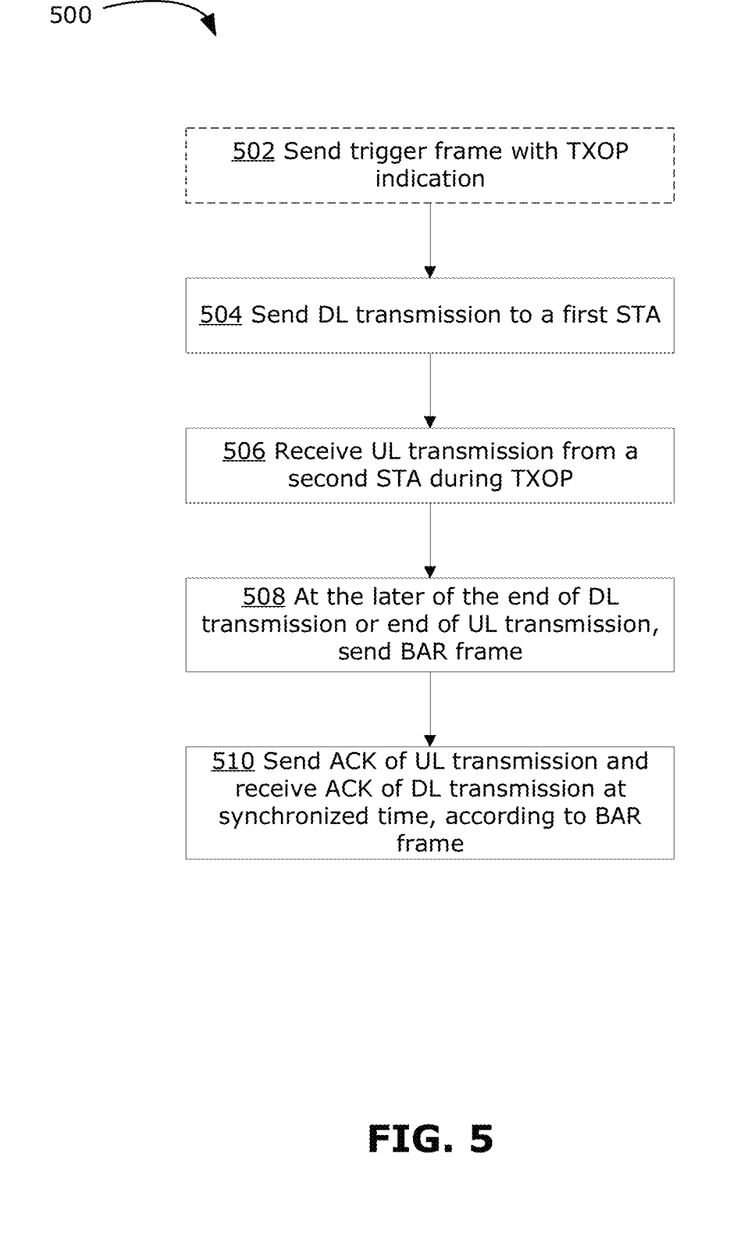
FIG. 5 is a flowchart illustrating an example method for performing full duplex communications, at an access point.

FIG. 5 illustrates an example method 500 that may be performed by a AP 102 for in an asymmetric FD communication.

At 502, optionally, the AP 102 may send a trigger frame that includes TXOP information, such as an indication of TXOP. Other TXOP information, as discussed above, may be included in the trigger frame.

At 504, the AP 102 sends the DL transmission 110 to a first STA (e.g., STA 1 104-1). If no trigger frame was sent at 502, or if the trigger frame did not include all TXOP information, the DL transmission 110 may include TXOP information (e.g., an indication of the TXOP) in its header (e.g., PHY header, MAC header or both), as discussed above.

At 506, the AP 102 receives a UL transmission 120 from a second STA (e.g., STA 5 104-5) during the TXOP. The UL transmission 120 at least partially overlaps in time with the DL transmission 110.

At 508, at the later of the end of the DL transmission 110 or the end of the UL transmission 120, the AP 102 sends a BAR frame 210. The BAR frame 210 may be directed to the first and second STAs involved in the DL and UL transmissions, respectively. In some examples, the BAR frame 210 may be broadcast to all associated STAs. Any STA not involved in the DL and UL transmissions may ignore the BAR frame 210.

At 510, the AP 102 sends an ACK of the UL transmission and receives an ACK of the DL transmission at the same synchronized time, according to the BAR frame 210. For example, the synchronized time may be defined by information contained in the BAR frame 210, or may be simply at a SIFS time period immediately following the BAR frame 210.

In some examples, the BAR frame 210 may not be needed to synchronize ACKs (e.g., where the TXOP information includes information about the PPDU length, so that the UL transmission and the DL transmission ends at the same time). In that case, 508 may be omitted, and the ACKs may be sent at 510 without waiting for the BAR frame 210.

Figure 6:
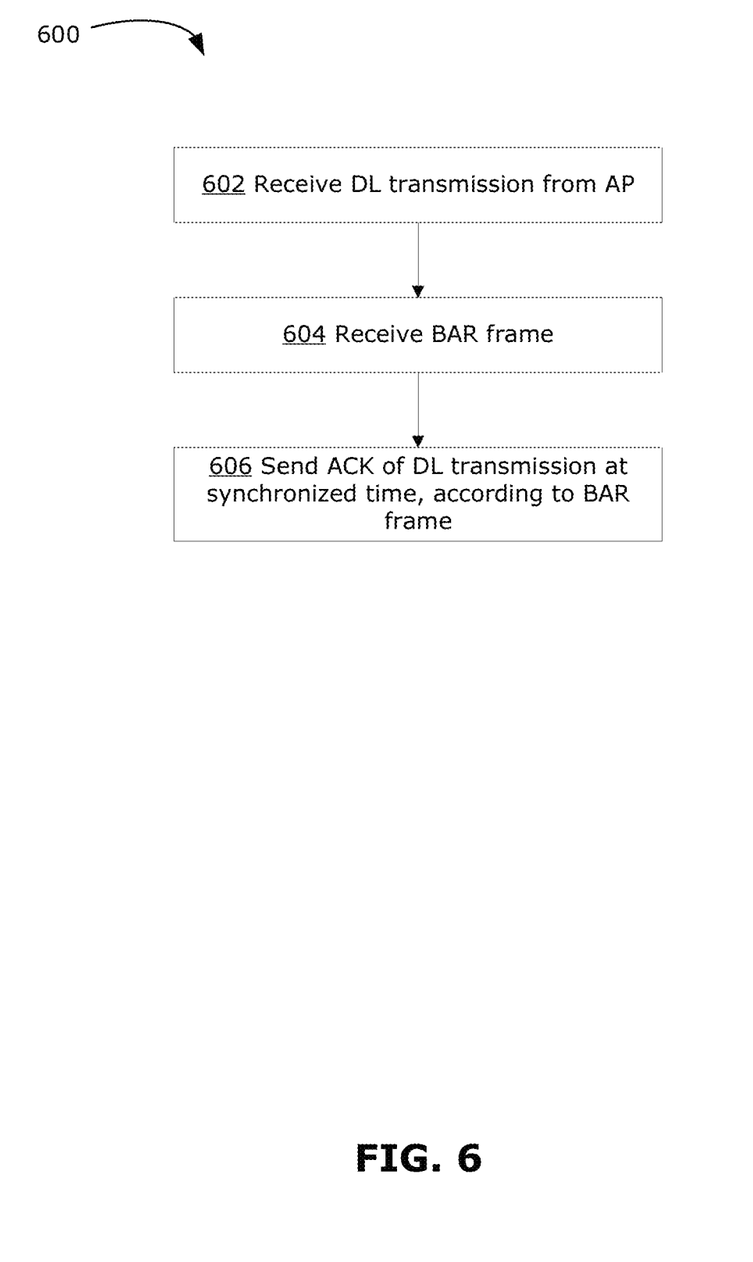
FIG. 6 is a flowchart illustrating an example method for receiving a downlink transmission, as part of full duplex communications, at a station.

FIG. 6 illustrates an example method 600 that may be performed by a first STA (e.g., STA 1 104-1) receiving a DL transmission 110 from the AP 102 in an asymmetric FD communication.

At 602, the first STA receives the DL transmission 110 from the AP 102.

At 604, the first STA receives the BAR frame 210 from the AP 102. The BAR frame 210 may or may not immediately follow the end of the DL transmission 110.

At 606, the first STA sends ACK back to the AP 102 at the synchronized time, according to the BAR frame 210.

In some examples, the BAR frame 210 may not be needed to synchronize ACKs (e.g., where the TXOP information includes information about the PPDU length, so that the UL transmission and the DL transmission ends at the same time). In that case, 604 may be omitted, and the ACK may be sent at 606 without waiting for the BAR frame 210.

Figure 7:
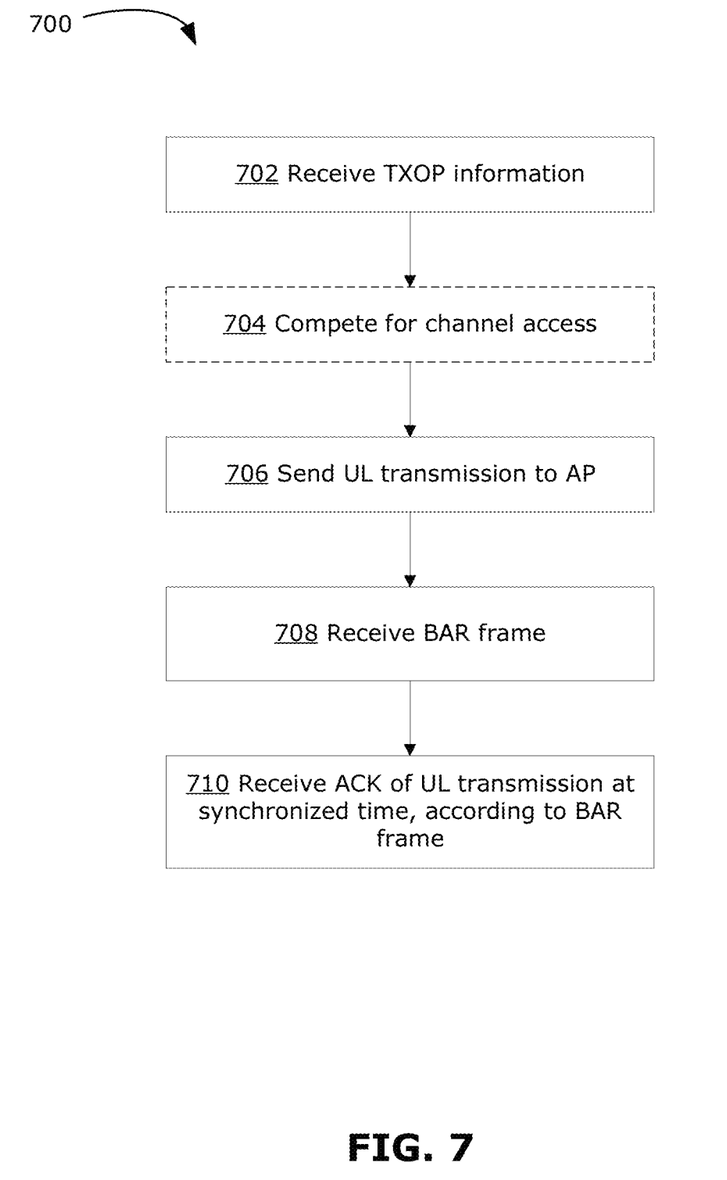
FIG. 7 is a flowchart illustrating an example method for uplink transmission, as part of full duplex communications, at a station.

FIG. 7 illustrates an example method 700 that may be performed by a second STA (e.g., STA 5 104-5) sending a UL transmission 120 to the AP 102 in an asymmetric FD communication.

At 702, the second STA receives TXOP information. The TXOP information may be received in a trigger frame sent by the AP 102 and/or contained in a header of a DL transmission 110 (e.g., data frame or other DL frame) from the AP 102 to another STA.

At 704, optionally, the second STA may compete for channel access with one or more other STAs. The contention may be carried out in accordance with contention parameters contained in the TXOP information.

At 706, the second STA (after winning the contention, if necessary) sends a UL transmission 120 to the AP 102. At least part of the UL transmission 120 overlaps in time with the DL transmission 110.

At 708, the second STA receives the BAR frame 210 from the AP 102. The BAR frame 210 may or may not immediately follow the end of the UL transmission 120.

At 710, the second receives ACK from the AP 102 at the synchronized time, according to the BAR frame 210.

In some examples, the BAR frame 210 may not be needed to synchronize ACKs (e.g., where the TXOP information includes information about the PPDU length, so that the UL transmission and the DL transmission ends at the same time). In that case, 708 may be omitted, and the ACK may be received at 710 without waiting for the BAR frame 210.

Figure 8:
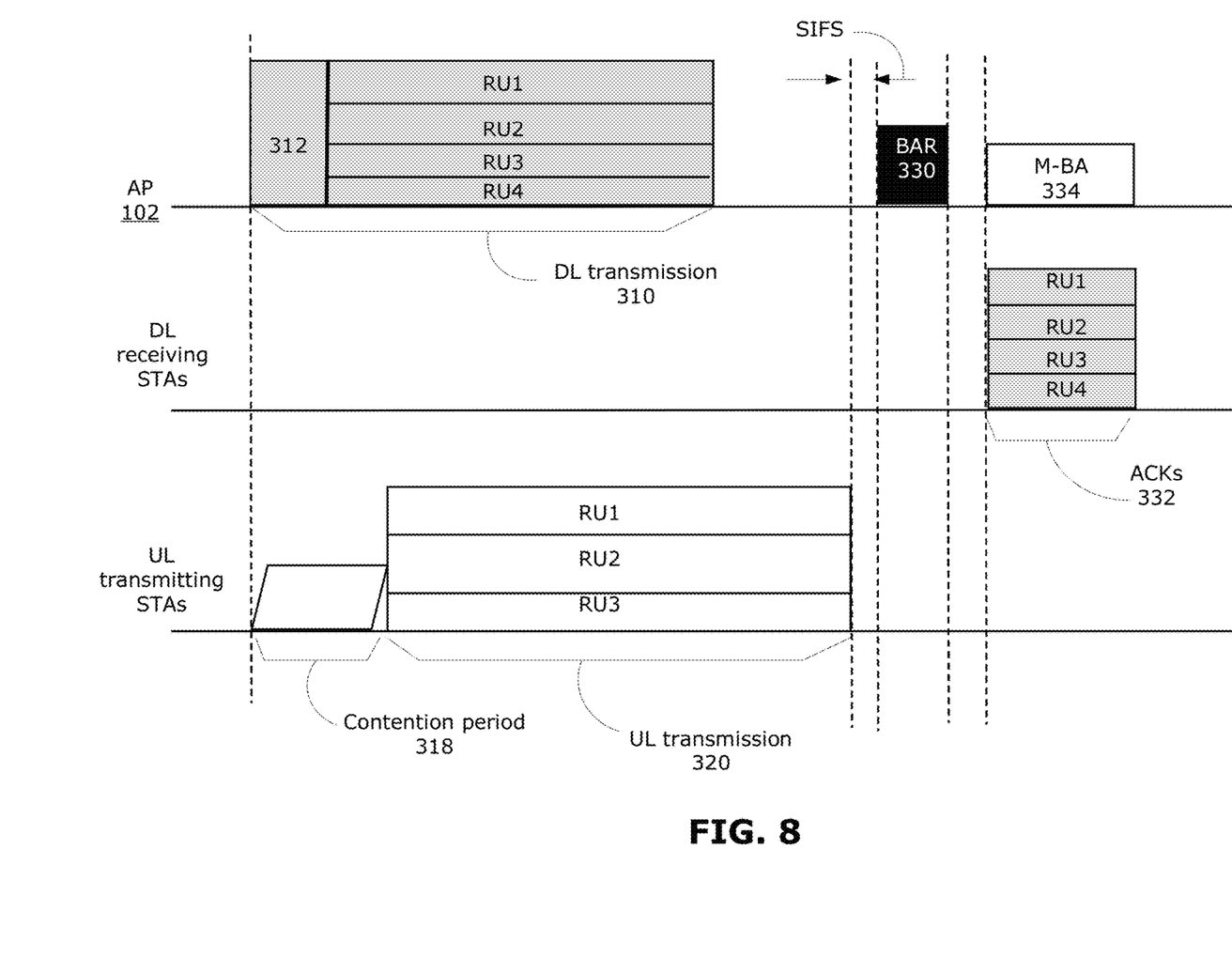
FIG. 8 is a timing diagram illustrating an example of multi-user full duplex communications.

The above examples may be implemented in multi-user (MU) transmission formats as well (e.g., using frequency multiplexing techniques such as orthogonal frequency division multiple access (OFDMA), or spatial multiplexing techniques such as multi-user multiple input multiple output (MU-MIMO)). An example of this is shown in FIG. 8. In this example, the DL and UL transmissions are MU frames (or PPDUs), represented in FIG. 8 as stacked resource units (RUs).

The MU DL transmission 310 may be similar to the DL transmission 110 described previously, including a header 312 similar to the header 112 described previously to provide some or all of the TXOP information. The MU DL transmission 310 in the example shown includes four RUs transmitted to four different DL receiving STAs. Although not shown, in some examples a trigger frame may be sent (e.g., broadcast) by the AP 102, as discussed previously, to provide some or all of the TXOP information, instead of or in addition to TXOP information provided in the header 312. The TXOP information (whether provided by the header 312 or a trigger frame or both) may include an indication of the MU UL TXOP. The indication of MU UL TXOP may also include an indication of which MU resource and the number of MU resources available for UL transmission.

The UL transmitting STAs may be selected by the AP 102, in a scheduled case, similarly to the previous description of the scheduled case. In the MU implementation, the AP 102 may assign a particular MU resource to each respective selected STA, and this information may be transmitted in the TXOP information (e.g., including an identifier of each selected STA and information relating each selected STA to a particular MU resource).

In the contention case, multiple STAs may compete for each MU resource during the contention period 318. Contention may be carried out in accordance with contention parameters defined in the TXOP information (e.g., as discussed previously). The AP 102 may specify, in the TXOP information, which two or more STAs may compete for a particular MU resource.

In some examples, the scheduled case and the contention case may be used in combination. For example, the AP 102 may assign a specific UL transmitting STA for one RU and allow two or more UL transmitting STAs to compete for another RU.

The UL transmitting STAs assigned to each respective RU (in the scheduled case) or that won contention for each respective RU (in the contention case) may then send a UL transmission 320 to the AP 102 over the respective RU. In the example shown, three RUs are used for UL transmission by three different UL transmitting STAs.

Similarly to the examples of FIGS. 3 and 4 discussed above, a BAR frame 330 may be sent by the AP 102, after the later of the end of the DL transmission 310 or the UL transmission 320, to synchronize ACKs. In the MU implementation, the BAR frame 330 sent by the AP 102 may include identification of the RUs assigned to the respective DL receiving STAs for transmitting their respective ACKs 332 to the AP 102. The AP 102 sends a multi-STA BlockAck (M-BA) 334 to the UL transmitting STAs to acknowledge receipt of the UL transmission 320. The M-BA 334 and the ACKs 332 from the DL receiving STAs are sent at the same synchronized time, according to the BAR frame 330.

The above examples describe ways of coordinating FD communications, where the AP has FD capabilities. In some cases, the above examples may be similarly implemented for a STA having FD capabilities, for example an FD-capable STA may engage in STA-to-STA FD communications with two other STAs, using the mechanisms described above.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for asymmetric full duplex (FD) communications, the method comprising:
   sending information about an uplink (UL) transmission opportunity (TXOP), the information about the TXOP including an indication of the TXOP;
   sending a downlink (DL) transmission to at least one first receiving station;
   during the TXOP, receiving an UL transmission from at least one second transmitting station, the UL transmission at least partially overlapping in time with the DL transmission;
   at a later one of end of the UL transmission and end of the DL transmission, sending a block acknowledgement request (BAR) frame to the at least one first receiving station; and
   sending acknowledgement of the UL transmission to the at least one second transmitting station and receiving acknowledgement of the DL transmission from the at least one first receiving station, at a synchronized time that is synchronized according to the BAR frame.

2. The method of claim 1, wherein the indication of the TXOP is sent in a header of the DL transmission.

3. The method of claim 1, wherein the indication of the TXOP is sent in a trigger frame broadcast ahead of the DL transmission.

4. The method of claim 1, wherein the information about the TXOP includes one or more contention parameters to permit two or more stations to compete for UL channel access.

5. The method of claim 4, wherein the one or more contention parameters include an identification of the two or more stations to compete for channel access.

6. The method of claim 1, wherein the DL transmission is a multi-user (MU) DL transmission to two or more receiving stations over respective resource units (RUs), wherein the information about the TXOP includes an indication of two or more RUs available for UL transmission by respective ones of two or more transmitting stations, and wherein acknowledgement of the UL transmission is a MU acknowledgement sent to the two or more transmitting stations.

7. A method for asymmetric full duplex (FD) communications, the method comprising:

receiving, in a frame header of a downlink (DL) transmission sent from an access point (AP) to at least one other DL receiving station, information about an uplink (UL) transmission opportunity (TXOP), the information about the TXOP including an indication of the TXOP;

sending an UL transmission to the AP, using the information about the TXOP, the UL transmission at least partly overlapping in time with the DL transmission;

receiving a block acknowledgement request (BAR) frame; and receiving acknowledgement of the UL transmission from the AP, at a synchronized time that is synchronized according to the BAR frame.

8. The method of claim 7, further comprising:

competing for channel access to send the UL transmission, the competing being carried out in accordance with one or more contention parameters included in the information about the TXOP.

9. The method of claim 8, wherein the one or more contention parameters includes an identification of two or more stations to compete for channel access.

10. An access point (AP) for full duplex (FD) communications, the AP comprising:

a memory;

an interface for wireless communication with at least one first receiving station and at least one second transmitting station; and a processing device configured to execute instructions stored in the memory to cause the AP to:

send information about an uplink (UL) transmission opportunity (TXOP), the information about the TXOP including an indication of the TXOP;

send a downlink (DL) transmission to the at least one first receiving station;

during the TXOP, receive an UL transmission from the at least one second transmitting station, the UL transmission at least partially overlapping in time with the DL transmission;

at a later one of end of the UL transmission and end of the DL transmission, send a block acknowledgement request (BAR) frame to the at least one first receiving station; and send acknowledgement of the UL transmission to the at least one second transmitting station and receive acknowledgement of the DL transmission from the at least one first receiving station, at a synchronized time that is synchronized according to the BAR frame.

11. The AP of claim 10, wherein the indication of the TXOP is sent in a header of the DL transmission.

12. The AP of claim 10, wherein the indication of the TXOP is sent in a trigger frame broadcast ahead of the DL transmission.

13. The AP of claim 10, wherein the information about the TXOP includes one or more contention parameters to permit two or more stations to compete for UL channel access.

14. The AP of claim 13, wherein the one or more contention parameters include an identification of the two or more stations to compete for channel access.

15. The AP of claim 10, wherein the DL transmission is a multi-user (MU) DL transmission to two or more receiving stations over respective resource units (RUs), wherein the information about the TXOP includes an indication of two or more RUs available for UL transmission by respective ones of two or more transmitting stations, and wherein acknowledgement of the UL transmission is a MU acknowledgement sent to the two or more transmitting stations.

16. A station (STA) for participating in full duplex (FD) communications, the STA comprising:

a memory;

an interface for wireless communication with an access point (AP); and a processing device configured to execute instructions stored in the memory to cause the STA to:

receive, in a frame header of a downlink (DL) transmission sent from the AP to at least one other DL receiving station, information about an uplink (UL) transmission opportunity (TXOP), the information about the TXOP including an indication of the TXOP;

send an UL transmission to the AP, using the information about the TXOP, the UL transmission at least partly overlapping in time with the DL transmission;

receive a block acknowledgement request (BAR) frame; and receive acknowledgement of the UL transmission from the AP, at a synchronized time that is synchronized according to the BAR frame.

17. The STA of claim 16, wherein the processing device is further configured to execute instructions to cause the STA to:

compete for channel access to send the UL transmission, the competing being carried out in accordance with one or more contention parameters included in the information about the TXOP.

18. The STA of claim 17, wherein the one or more contention parameters includes an identification of two or more stations to compete for channel access.

* * * * *